March 6, 1934.  H. BIENER  1,950,291
RAZOR STROP
Filed Sept. 30, 1932
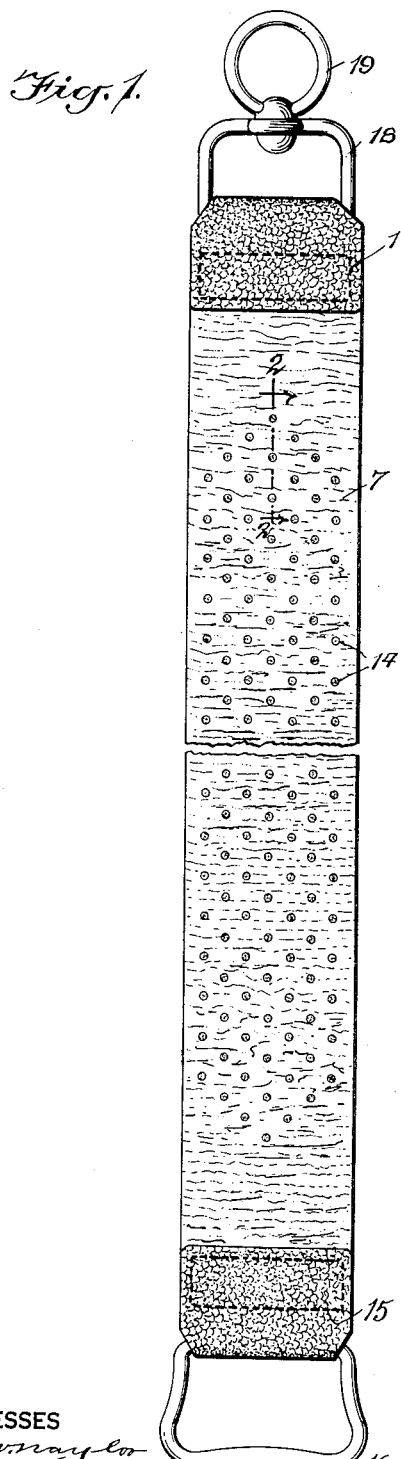
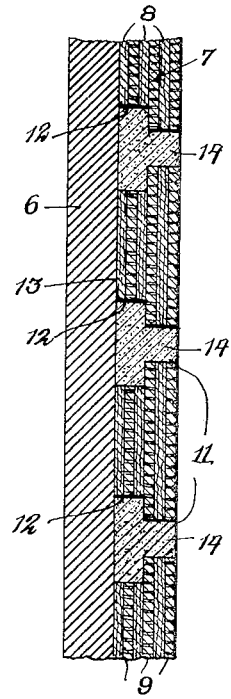
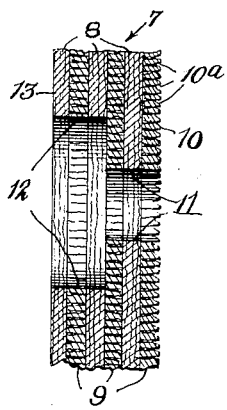
WITNESSES
INVENTOR
Herman Biener
BY
ATTORNEYS Patented Mar. 6, 1934

1,950,291

UNITED STATES PATENT OFFICE 1,950,291

RAZOR STROP

Herman Biener, Brooklyn, N. Y.

Application September 30, 1932, Serial No. 635,645

1 Claim. (Cl. 51—200)

The invention relates to razor strops and has for an object to provide a strop having a member with a face in openings in which an abrasive substance is disposed.

Another object of the invention is to provide a razor strop with a laminated member having an outer face with a transverse grain filled with the abrasive substance.

Still another object of the invention is to provide a member with opposite faces, the member having apertures therethrough which are filled with the abrasive, the apertures at one of the faces of the member being enlarged to receive the abrasive, which serve as heads to hold the abrasive in the apertures.

Additional objects of the invention will appear in the following specification in which the preferred form of the invention is described.

In the drawing similar reference characters refer to similar parts in all the views, of which Figure 1 is a front elevation of the improved razor strop, Figure 2 is an enlarged fragmentary sectional view on the line 2—2 of Figure 1, and Figure 3 is an enlarged fragmentary sectional view showing the laminated member before the apertures therein have been filled with the abrasive.

By referring to the drawing it will be seen that the razor strop consists of a leather member 6 and a laminated member 7, which are best shown in Figure 2. The leather member 6 is of the usual type, but the laminated member is constructed along novel lines. The laminated member 7 is made of soft grained wood and, as shown in Figure 2, there are six layers, three of these layers 8 preferably having their grain extending in one direction, while the other three layers 9 have their grain extending in another direction, with the grain of the layer at the outer face 10 of the laminated member 7 extending transversely, as best shown in Figure 1. These layers 8 and 9 are glued together and there are apertures 11 through the laminated member, the apertures 11 being enlarged laterally, as shown at 12, at the inner face 13 of the laminated member 7. With the laminated member 7 constructed as has been described, and with the apertures 11 with their enlargements 12, all of which are best shown in Figure 3, the face 13 of the laminated member 7 is disposed on a smooth surface and is held snugly thereto, when an abrasive 14 is introduced at the outer face 10 of the laminated member 7, this abrasive not only filling the apertures 11, but also their enlargements 12, the abrasive also filling the transverse grain at $10^a$ in the outer face 10 of the laminated member 7. The laminated member 7 is then secured at its inner face 13 to the leather strop member 6, so that the leather strop 6 and the laminated member 7 will be secured together, as shown in Figure 2, and with the apertures 11, together with their enlargements 12, filled with the abrasive 14, the abrasive also serving to fill the transverse grain $10^a$ in the outer face 10 of the laminated member 7.

In this way, the abrasive substance 14 will be held at the apertures 11 with the assistance of the heads formed at the enlargements 12, these apertures 11 being disposed throughout the body of the face of the laminated member, as shown in Figure 1, and being spaced apart, the transverse grain $10^a$ in the outer face 10 of the laminated member 7 being also filled with the abrasive, as has been stated.

When the leather strop member 6 and the laminated member 7 have been secured together by glue or other adhesive, a member 15 is secured to the ends of the strop formed by the leather strop member 6 and the laminated member 7 to hold a handle 16, another member 17 being secured to the other end of the strop as a means of securing a member 18 having a ring 19.

What is claimed is:

In a razor strop, a laminated wooden member having an outer face with a transverse grain, the member having apertures therethrough which are enlarged at the opposite face of the member, an abrasive substance disposed in the transverse grain of the outer face of the member, in the apertures and in the enlargements therein, the abrasive substance at the said enlargements forming heads which serve to hold the abrasive substance in the apertures adjacent the outer face of the member, and a leather strop member secured to the said opposite face of the laminated wooden member.

HERMAN BIENER.